United States Patent
Hein et al.

(10) Patent No.: US 11,738,313 B2
(45) Date of Patent: Aug. 29, 2023

(54) MIXER ARRANGEMENT AND METHOD FOR OPERATING A MIXER ARRANGEMENT

(71) Applicant: TENNECO GMBH, Edenkoben (DE)

(72) Inventors: Eric Hein, Edenkoben (DE); Yannick Leske, Edenkoben (DE); Anna Menges, Edenkoben (DE); Günter Palmer, Edenkoben (DE)

(73) Assignee: Tenneco GmbH, Edenkoben (DE)

( * ) Notice: Subject to any disclaimer, the term of this patent is extended or adjusted under 35 U.S.C. 154(b) by 0 days.

(21) Appl. No.: 17/911,055

(22) PCT Filed: Mar. 9, 2021

(86) PCT No.: PCT/EP2021/055918
§ 371 (c)(1),
(2) Date: Sep. 12, 2022

(87) PCT Pub. No.: WO2021/180721
PCT Pub. Date: Sep. 16, 2021

(65) Prior Publication Data
US 2023/0105940 A1    Apr. 6, 2023

(30) Foreign Application Priority Data
Mar. 13, 2020  (DE) ............... 10 2020 106 983.9

(51) Int. Cl.
*B01F 35/83*     (2022.01)
*B01F 25/432*    (2022.01)
(Continued)

(52) U.S. Cl.
CPC ............ *B01F 35/833* (2022.01); *B01F 23/12* (2022.01); *B01F 23/2132* (2022.01);
(Continued)

(58) Field of Classification Search
CPC ..................... F01N 2410/00; F01N 2240/36
See application file for complete search history.

(56) References Cited

U.S. PATENT DOCUMENTS

2005/0013756 A1 * 1/2005 Amou ............... B01D 53/9495
                                                      422/177
2010/0005790 A1    1/2010 Zhang
2015/0040537 A1    2/2015 Hicks et al.

FOREIGN PATENT DOCUMENTS

CN      110578582 A    12/2019
DE      19913462 A1    9/2000
(Continued)

*Primary Examiner* — Anthony Ayala Delgado
(74) *Attorney, Agent, or Firm* — Harness, Dickey & Pierce, P.L.C.

(57) ABSTRACT

A mixer arrangement for an exhaust gas system, having an inlet opening through which an exhaust gas mass flow (A) can be guided, and a mixer for swirling the exhaust gas, which has at least one inflow opening that is fluidically connected to the inlet opening, wherein at least one first portion (A1) of the exhaust gas mass flow (A) can be guided through the mixer via the at least one inflow opening, an injection device by means of which an additive can be injected, and a bypass having at least one throughflow opening which is fluidically connected to the inlet opening and through which a second portion (A2) of the exhaust gas mass flow (A) can be guided past the mixer, there being provided at least one regulating body by means of which a flow cross-section Q in the mixer arrangement can be varied such that a ratio V with (formula I) can be varied.

15 Claims, 2 Drawing Sheets

(51) Int. Cl.
  *B01F 23/10* (2022.01)
  *B01F 35/93* (2022.01)
  *B01F 25/10* (2022.01)
  *B01F 23/213* (2022.01)
  *F01N 13/08* (2010.01)
  *B01F 35/90* (2022.01)
  *B01D 53/94* (2006.01)

(52) U.S. Cl.
  CPC ............ *B01F 25/10* (2022.01); *B01F 25/432* (2022.01); *B01F 35/93* (2022.01); *F01N 13/082* (2013.01); *B01D 53/9431* (2013.01); *B01F 2035/99* (2022.01)

(56) References Cited

FOREIGN PATENT DOCUMENTS

| | | |
|---|---|---|
| DE | 112014003618 T5 | 5/2016 |
| EP | 1481719 A2 | 12/2004 |
| JP | 2010101236 A | 5/2010 |

* cited by examiner

MIXER ARRANGEMENT AND METHOD FOR OPERATING A MIXER ARRANGEMENT

CROSS-REFERENCE TO RELATED APPLICATIONS

This application is a U.S. National Phase application under 35 U.S.C. 371 of International Application No. PCT/EP2021/055918, filed on Mar. 9, 2021, which claims the benefit of German Patent Application No. 10 2020 106 983.9, filed on Mar. 13, 2020. The entire disclosures of the above applications are incorporated herein by reference.

FIELD

The disclosure relates to a mixer arrangement for an exhaust gas system, having an inlet opening through which an exhaust gas mass flow A can be guided into the mixer arrangement, a mixer for swirling the exhaust gas, which has at least one inflow opening that is fluidically connected to the inlet opening, wherein at least one first portion A1 of the exhaust gas mass flow A can be guided through the mixer via the at least one inflow opening, an injection device by means of which an additive can be injected, and a bypass having at least one throughflow opening which is fluidically connected to the inlet opening and through which a second portion A2 of the exhaust gas mass flow A can be guided past the mixer.

In addition, the disclosure relates to a method for operating a mixer arrangement for an exhaust gas system, having an inlet opening through which an exhaust gas mass flow A is guided, a mixer which has at least one inflow opening that is fluidically connected to the inlet opening, wherein at least one first portion A1 of the exhaust gas mass flow A is guided through the mixer via the at least one inflow opening, wherein the mixer has an injection device, wherein an additive is injected into an injection section of the mixer by means of the injection device, and a bypass having at least one throughflow opening which is fluidically connected to the inlet opening and through which a second portion A2 of the exhaust gas mass flow A is guided past the mixer.

BACKGROUND

This section provides background information related to the present disclosure which is not necessarily prior art.

A mixer arrangement is already known from US 2010/0005790 A1, which has a mixer and a bypass, wherein a part of the exhaust gas mass flow A can be guided past the mixer through the bypass. The bypass has multiple openings within an intermediate wall of the mixer arrangement.

CN 110578582 A describes a mixer arrangement for mixing an additive into the exhaust gas flow with a SCR catalytic converter arranged in parallel. A mixer arrangement having a mixing pipe for mixing an additive into the exhaust gas is known from U.S. Pat. No. 2,010,005 790 A1.

SUMMARY

This section provides a general summary of the disclosure, and is not a comprehensive disclosure of its full scope or all of its features.

The object which forms the basis of the disclosure is to configure and arrange a mixer arrangement in such a way that the mixer performance is optimized.

The object is achieved according to the disclosure in that there is provided at least one regulating body by means of which at least one flow cross-section in the mixer arrangement can be varied so that a ratio V with $$V = \frac{A2}{V1}$$

can be varied. This ensures that the exhaust gas mass flow A1 through the mixer can be adjusted. A flow cross-section of the at least one throughflow opening, the bypass channel and/or the at least one inflow opening can be varied. It is also conceivable that the flow cross-section Q is varied at another expedient point within the mixer arrangement. To this end, the regulating body can be placed at the appropriate point.

A mixer per se swirls the exhaust gas. For this purpose, the mixer can have guide plates. The mixer is optimized in such a way that the most effective possible swirling is achieved, for instance in order to guarantee that an additive is mixed in as homogeneously as possible. The degree of swirling is dependent on the first portion A1 of the exhaust gas mass flow A through the mixer, which in turn varies depending on engine parameters, in particular engine loads and/or the engine speeds, as well as exhaust gas temperatures and/or the exhaust gas mass flow A. In this respect, the efficiency of the mixer is dependent on the degree of swirling and, therefore, on the exhaust gas mass flow A.

During normal operation of the motor vehicle, the first portion A1 of the exhaust gas mass flow A through the mixer varies considerably. The range of this variance is correspondingly large. In order to optimize the mixer performance, a bypass and a regulating body are provided, with the aid of which it is possible to vary the first portion A1 of the exhaust gas mass flow A through the mixer. The first portion A1 of the exhaust gas mass flow A can be varied in such a way that the variance range ΔA1 thereof is reduced with respect to operation without the regulating body. In this way, the efficiency of the swirling can be increased since the structure of the mixer can be designed for this optimized variance range ΔA1, as a result of which the mixer efficiency increases.

The mixer is preferably a swirl mixer, that is to say a mixer which is designed in such a way that the exhaust gas mass flow A in the mixer flows helically along a swirl path. The inflow openings can be arranged around the injection region so that the additive can be injected into the axial center of the swirl path. However, other mixers are in principle also conceivable.

The regulating body can be a valve or a flap. The regulating body can be actively regulated or it can be configured to be passive. In the case of active regulation, a control device can be provided for active regulation. The control device can regulate the ratio V as a function or depending on engine parameters, in particular engine loads and/or the engine speeds, as well as exhaust gas temperatures and/or the exhaust gas mass flow A. In the case of a passive regulating body, the flap can open depending on the existing exhaust gas pressure so that the second portion A2 of the exhaust gas mass flow A increases.

The throughflow opening can be designed and/or placed in such a way that only the second portion A2 of the exhaust gas mass flow A flows in.

The inlet opening, through which the exhaust gas mass flow A arrives in the mixer arrangement, can be provided in an antechamber as part of the mixer arrangement. The antechamber can be configured separately from the exhaust gas pipe. The inflow opening of the mixer and/or the throughflow opening of the bypass can correspondingly fluidically connect the mixer or the bypass to the antechamber such that the corresponding first portion A1 and/or second portion A2 of the exhaust gas mass flow A can arrive in the mixer or the bypass from the antechamber. In addition, a post-chamber having an outlet opening can be provided downstream of the mixer and the bypass, in which post-chamber the first portion A1 and the second portion A2 can be combined. The post-chamber can also be configured separately from the exhaust gas pipe. The post-chamber can have an outlet opening from which the exhaust gas mass flow A can be guided out of the mixer arrangement.

An injection device can be provided for the mixer arrangement, wherein an additive can be injected by means of the injection device. The mixer arrangement can be provided upstream of a SCR and/or a SDPF or another catalytic converter.

Finally, the object is achieved if a regulating body is provided, wherein at least one flow cross-section in the mixer arrangement is varied by means of the regulating body so that a ratio V with $$V = \frac{A2}{V1}$$

is varied during the operation of the exhaust gas system. The method relates to the operation of a mixer as explained. The advantages which were explained regarding the mixer apply.

It can additionally be advantageous if the injection device is placed on the mixer, wherein an additive can be injected into an injection section of the mixer by means of the injection device. The injection device can be arranged on a face of the mixer. The face can have only one opening for the injection device. The injection section can be provided downstream of the at least one inflow opening of the mixer. The inflow openings can be provided in a mixer wall and can surround the injection section in a circumferential direction.

To this end, it can also be advantageous if the regulating body has an actuator by means of which the ratio V is varied such that a variance range $\Delta A1$ of the first portion A1 of the exhaust gas mass flow A is minimized depending on at least one engine parameter, in particular an engine load, an engine speed, an exhaust gas temperature and/or an exhaust gas mass flow A. The actuator can be a correspondingly designed spring or can be actively controlled by means of a control unit. The variance range $\Delta A1$ can be varied in such a way that it is narrower by at least 50%, 60%, 70%, 80% or 90% with respect to operation without the regulating body. The ratio V can be varied in such a way that the variance range $\Delta A1$ is so narrow that the first portion A1 of the exhaust gas mass flow A is virtually constant. This can be the case if it is at least 95% narrower.

The efficiency of the mixer is dependent upon the first portion A1 of the exhaust gas mass flow A through the mixer. If the variance range $\Delta A1$ is kept as small as possible by the regulating body, the injection conditions are virtually constant during different operating conditions of the vehicle and the structure of the mixer can be designed even better, especially for this variance range $\Delta A1$.

It can additionally be advantageous if an electronic control unit is provided, which is coupled to the regulating body and which regulates an actuator of the regulating body depending on at least one engine parameter, in particular the engine load, the engine speed, an exhaust gas temperature and/or the exhaust gas mass flow A. Furthermore, an active regulation by means of the control unit optimizes the efficiency of the mixer.

It can also be advantageous if the regulating body is designed in such a way that it varies at least the flow cross-section of the at least one throughflow opening. The regulating body can also only vary the flow cross-section of the at least one throughflow opening. The variation of the flow cross-section at the at least one throughflow opening is advantageous, since undesired swirling is thus avoided to the greatest possible extent, and the embodiment is inexpensively feasible and easy to realize.

It can be advantageously provided that the regulating apparatus can be brought into a first position P1 and a second position P2, wherein the second portion A2 of the exhaust gas mass flow A through the bypass in the first position P1 of the regulating body is at most 30%, 20%, 10% or 0% with respect to the second portion A2 of the exhaust gas mass flow A in a second position P2 of the regulating body.

The first position P1 can be the closed or virtually closed position of the regulating body. The second position P2 can be the opened or virtually opened position. If the second portion A2 of the exhaust gas mass flow A through the bypass in a closed position of the regulating body is greater than 0% with respect to the second portion A2 of the exhaust gas mass flow A in the open position of the regulating body, the regulating body in its closed position does not result in complete bridging of the bypass and does not lead to the entire mass flow flowing through the mixer.

It can be particularly important for the present disclosure if the mixer has a mixer wall which has a tubular configuration, wherein multiple inflow openings are provided, wherein at least one blade is provided, which is set at an angle $\alpha$ with respect to an inflow opening so that a swirl movement of the exhaust gas can be generated in the injection section. The inflow openings can be longitudinal slots. At least two, three or four blades can also be provided. The at least one blade can be provided at an inflow opening, with respect to which it is set. The at least two, three or four blades can also each be provided at an inflow opening, with respect to which they are each set. $25° \leq \alpha \leq 45°$ or $30° \leq \alpha \leq 40°$ can apply to the angle $\alpha$.

Such a mixer can be a swirl mixer. The inflow openings can be arranged around the injection region. The variation of the ratio V influences a swirl number which constitutes the ratio of an axial and a tangential speed component of the first portion A1 of the exhaust gas mass flow A. This swirl number can in particular be varied depending on the first portion A1 of the exhaust gas mass flow A. The narrower the variance range $\Delta A1$, the more constant the swirl number is. In this way, the efficiency of the mixer increases.

In connection with the configuration and arrangement according to the disclosure, it can be advantageous if at least two blades are set at a different angle $\alpha$ with respect to the corresponding inflow openings in such a way that the exhaust gas mass flow B through each of the inflow openings is evened out. In this way, a swirl movement of the exhaust gas can be generated with a swirl axis which can lie on a central axis of the mixer. For this purpose, at least three, four or all of the blades of the mixer can also be set at different angles $\alpha$. Two blades opposite one another can also be set at the same angle $\alpha$ and the further blades can be set at a different angle $\alpha$ to this.

The swirl axis can be defined in such a way that the axial speed component of the first portion A1 runs around the swirl axis and the swirl axis lies parallel to the tangential speed component. The swirl axis can be defined in such a way that it lies in the center of the swirl path and/or the helix, wherein the helix can be formed by the swirl path.

Depending on the direction from which the main flow of the exhaust gas strikes the mixer and the geometry of the housing of the mixer arrangement, which surrounds the mixer, the exhaust gas mass flow B per se through the inflow openings is different. By setting the blade, the flow cross-section of the inflow openings can be adapted in such a way that the exhaust gas mass flow B through each of the inflow openings is the same. The efficiency of the mixer can therefore be increased, and the wetting of a mixer wall can additionally be avoided so that no local wall cooling occurs.

It can additionally be advantageous if the mixer has a mixer wall, wherein the mixer wall has an evaporation section downstream of the injection section, which can be wetted with the additive. The injection conditions are thus optimized such that the mixer can be designed in terms of its structure such that the surface of the mixer wall that is wetted by the additive is kept sufficiently large for all operating parameters, if possible, in order to evaporate evenly. In this way, strong or excessive local wall cooling can be avoided, which prevents the additive being deposited.

In addition, it can be advantageous if an active heating element for heating the evaporation section is provided. The active heating element can be actively operated by an external measure. In this way, local wall cooling is counteracted and, consequently, deposits of the additive are additionally prevented.

It can additionally be advantageous if the mixer has a mixer wall and the bypass has a bypass channel, wherein, in the region of the evaporation section, in particular in an overlapping region, the mixer wall at least partially forms the bypass channel, or the mixer wall at least partially adjoins the bypass channel or the mixer wall is at least partially joined to the bypass channel, so that a heat exchange can take place in each case between the mixer wall and the second portion A2 of the exhaust gas mass flow A. The mixer can lie with its overlapping region within the bypass channel such that the bypass channel completely surrounds the mixer wall. In this way, the hot exhaust gas of the second portion A2 of the exhaust gas mass flow A additionally heats the mixer wall of the evaporation section through the bypass channel, and local wall cooling is thus additionally actively counteracted, as a result of which deposits of the additive are additionally avoided. In addition, the second portion A2 of the exhaust gas mass flow A can be guided in a spiral shape around the mixer wall, in particular in the region of the evaporation section, by further measures.

It can be advantageous if a perforation of the mixer wall is provided in the evaporation region, in particular in the overlapping region. Hot exhaust gas arrives in the mixer from the bypass channel through the perforation and heats the mixer wall on a second surface of the mixer which can be wetted with additive. Likewise, this measure counteracts the deposits of the additive on the mixer wall.

To this end, it can be advantageous if at least one elevated structure is provided on a first surface facing the bypass channel in the region of the evaporation section, in particular in the overlapping region. The structure can be an integral part of the first surface, consequently the structure and the first surface can be one part and, in this respect, form a monolithic structure. The structure can be an element which is separate from the first surface and which is mounted on the first surface. Multiple structures can also be provided. If multiple structures are provided, a first part of these structures can be configured integrally and/or a second part of these structures can be configured separately. The first surface can be a surface of the mixer wall and/or a surface of the bypass channel. The measures enlarge the surface of the mixer wall and optimize a heat transfer between the second portion A2 of the exhaust gas mass flow A and the mixer wall. The additional elevated structures can also be provided on the active heating element and/or the further measures for guiding the second portion A2 of the exhaust gas mass flow A in a spiral shape around the evaporation pipe. To this end, it can also be advantageous if a second surface of the mixing wall, which can be wetted with the additive, is smoothed in the evaporation section. The smoothing can avoid deposits. The second surface can face the injection device.

It can additionally be advantageous if a post-chamber is provided downstream of the mixer, in which post-chamber the first portion A1 of the exhaust gas mass flow A and the second portion A2 of the exhaust gas mass flow A can be combined, wherein the post-chamber has an outlet opening from which the exhaust gas mass flow A can be guided out of the mixer arrangement. The bypass can open out into the post-chamber via an exit opening. The mixer can open out into the post-chamber via an outflow opening.

To this end, it can also be advantageous if the regulating body has an actuator by means of which the ratio V is varied such that a variance range $\Delta A1$ of the first portion A1 of the exhaust gas mass flow A is minimized depending on at least one engine parameter, in particular an engine load, an engine speed, an exhaust gas temperature and/or the exhaust gas mass flow A.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further advantages and details of the disclosure are explained in the claims and in the description and depicted in the figures, wherein:

Corresponding reference numerals indicate corresponding parts throughout the several views of the drawings.

DETAILED DESCRIPTION

Example embodiments will now be described more fully with reference to the accompanying drawings.

Figure 1:
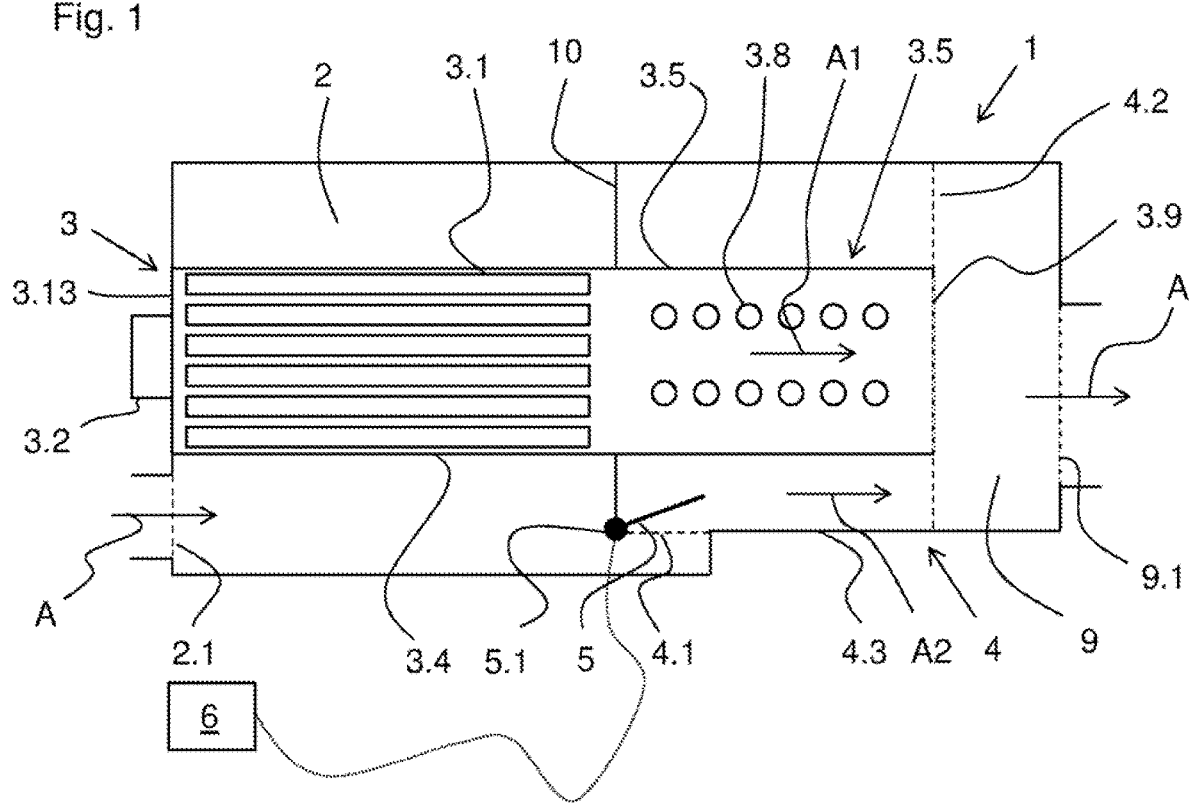
FIG. 1 shows a cross-section of the mixer arrangement.

According to FIG. 1, the mixer arrangement 1 has an antechamber 2, a mixer 3, a bypass 4, a regulating body 5 and a post-chamber 9.

An exhaust gas mass flow A can arrive in the antechamber 2 via an inlet opening 2.1. A first portion A1 of the exhaust gas mass flow A can flow into the mixer 3 from here via inflow openings 3.1 which are formed as longitudinal slits.

A second portion A2 of the exhaust gas mass flow A can be guided by way of a throughflow opening 4.1 into the bypass 4.

In addition to the inflow openings 3.1, the mixer 3 has an injection device 3.2 on its face 3.13 by means of which an additive can be injected into the mixer 3. In addition, the mixer 3 has a mixer wall 3.4 which conducts the first portion A1 of the exhaust gas mass flow A. In an evaporation section 3.5 of the mixer 3, which is located downstream of the injection device 3.2, perforations 3.8 are provided, via which a part of the exhaust gas can arrive in the mixer 3 from the bypass 4. Further downstream of the perforations 3.8, an outflow opening 3.9 is provided, via which the first portion A1 of the exhaust gas mass flow A can open out into the post-chamber 9.

The regulating body 5 varies the second portion A2 of the exhaust gas mass flow A which can flow through the bypass 4. To this end, the regulating body 5, which is configured here as a movably supported flap, can vary the flow cross-section Q of the throughflow opening 4.1 by means of an actuator 5.1 so that a ratio V with $$V = \frac{A2}{V1}$$

can be varied. An electrical control device 6 is coupled to the regulating body 5. Said electrical control device regulates the regulating body 5 via the actuator 5.1 depending on at least one engine parameter, in particular the engine load and/or the engine speed, an exhaust gas temperature and/or the exhaust gas mass flow A in such a way that a variance range ΔA1 of the first portion A1 of the exhaust gas mass flow A is minimized. In addition, the bypass 4 has a bypass channel 4.3 through which the second portion A2 of the exhaust gas mass flow A flows. The second portion A2 of the exhaust gas mass flow A arrives in the post-chamber 9 via an exit opening 4.2.

The first portion A1 and the second portion A2 of the exhaust gas mass flow A are combined in the post-chamber 9. The exhaust gas mass flow A leaves the mixer arrangement 1 via an outlet opening 9.1 of the post-chamber 9.

The openings are each indicated by the dashed lines.

Figure 2:
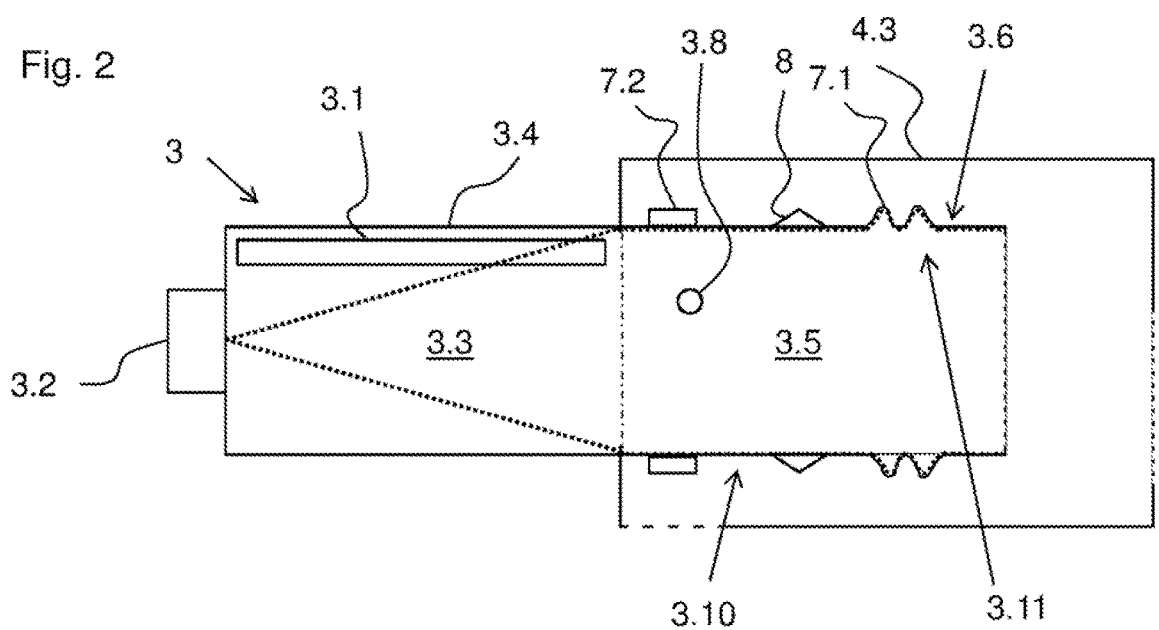
FIG. 2 shows a cross-section through the mixing pipe and the bypass channel.

In accordance with FIG. 2, the mixer 3 has an injection section 3.3 and an evaporation section 3.5. The injection section 3.3 is the chamber into which the injection device 3.2 injects an additive. The evaporation section 3.5 is provided downstream of the injection section 3.3. The injection cone of the additive is indicated by the dotted line. The inflow openings 3.1 are arranged around the injection section 3.3, wherein only one of the injection openings 3.1 is depicted for the sake of clarity. Likewise, only one opening of the perforation 3.8 is depicted. The injection cone widens so that the additive wets the mixer wall 3.4 on a second surface 3.11, consequently the inner side of the mixer wall 3.4, in the evaporation section 3.5. The dotted-dashed line illustrates the transition between the injection section 3.3 and the evaporation section 3.5 of the mixer 3.

The mixer wall 3.4 of the evaporation section 3.5 forms a part of the bypass channel 4.3 in an overlapping region 3.10. Therefore, a heat exchange between the bypass channel 4.3 and the mixer wall 3.4 is guaranteed.

The mixer 3 has elevated structures 7.1, 7.2 in the evaporation section 3.5. The structures 7.1, 7.2 are provided on a first surface 3.6 of the mixer 3, consequently the outer side of the mixer wall 3.4 which faces the bypass channel 4.3 in the overlapping region 3.10. The structures 7.1 are an integral part of the first surface 3.6 of the mixer wall 3.4. The structures 7.2, on the other hand, are configured separately from the first surface 3.6 of the mixer wall 3.4. In the overlapping region 3.10 on the first surface 3.6 of the mixer 3, an active heating element 8 for heating the mixer wall 3.4 is, in addition, provided. Downstream of the active heating element 8, the mixer wall is uneven, consequently corrugated. By means of these measures, the temperature of the mixer wall 3.4 can be additionally increased in the evaporation section 3.5 so that local cooling of the mixer wall 3.4 is avoided, which prevents the injected additive from being deposited.

Figure 3A:
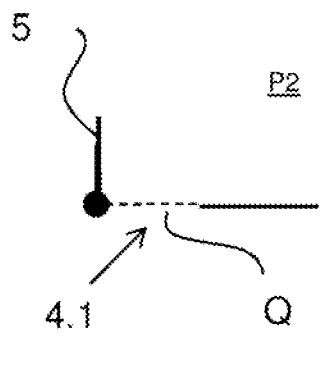
FIG. 3 shows a completely opened and closed position of the regulating body.
Figure 3B:
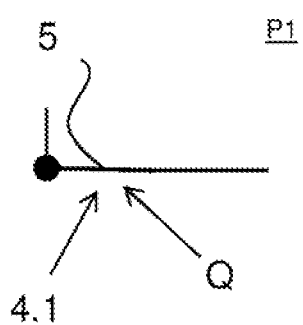

In FIG. 3a, the regulating body 5 is depicted in a second position P2. In the second position P2, the regulating body 5 is completely opened and releases 100% of an effective flow cross-section Q of the throughflow opening 4.1. In contrast to this, in FIG. 3b, the regulating body 5 is shown in a first position P1 in which it completely seals the effective flow cross-section Q of the injection opening 4.1. In the closed position P1, the bypass 4 is bridged and the entire exhaust gas mass flow A flows through the mixer 3.

Figure 4:
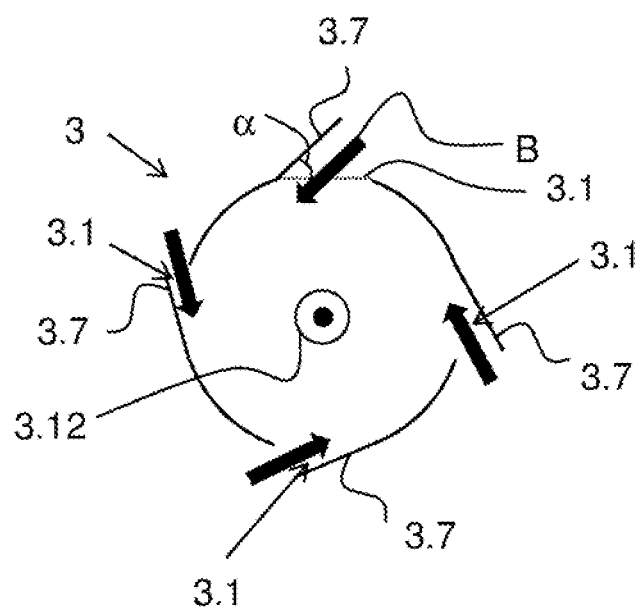
FIG. 4 shows a cross-section through the mixer wall at the height of the inlet openings.

In accordance with FIG. 4, the mixer 3 has blades 3.7 which are each provided at the inflow openings 3.1. The blades 3.7 are each set at an angle α with respect to the inflow openings 3.1. This guarantees that the exhaust gas mass flow B through each of the inflow openings 3.1 is the same. As a result of this measure, the swirl axis of the swirl movement and the central axis 3.12 of the mixer 3 coincide, which additionally avoids additive being deposited.

Figure 5:
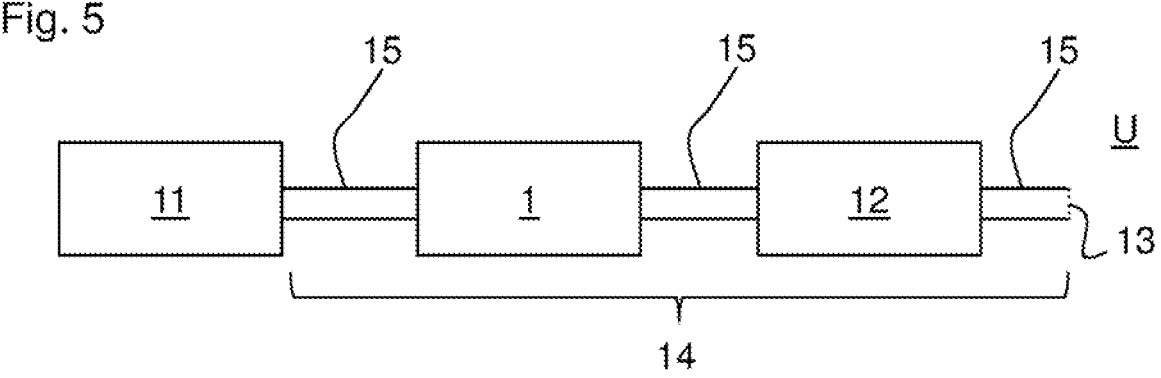
FIG. 5 shows an exhaust gas system having the mixer arrangement.

The mixer arrangement 1 is provided in an exhaust gas system 14 in accordance with FIG. 5. The exhaust gas system 14 begins after an engine 11 in the exhaust gas system 14. The mixer arrangement 1 is placed downstream of the engine 11. A catalytic converter 12 is provided downstream of the mixer arrangement 1. The catalytic converter 12 can be an SCR and/or a SDPF. The exhaust gas mass flow A which is guided through the exhaust gas system 14 opens out into the surroundings U via the exhaust opening 13. The depicted components are fluidically connected via an exhaust pipe 15. The exhaust gas system 14 can have further components.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A mixer arrangement for an exhaust gas system, having
   an inlet opening through which an exhaust gas mass flow A is guided into the mixer arrangement,
   a mixer for swirling the exhaust gas, which has at least one inflow opening that is fluidically connected to the inlet opening, wherein at least one first portion A1 of the exhaust gas mass flow A is guided through the mixer via the at least one inflow opening, wherein the mixer has guide plates in order to swirl the exhaust gas,
   an injection device by means of which an additive is injected,
   and a bypass having at least one throughflow opening which is fluidically connected to the inlet opening and through which a second portion A2 of the exhaust gas mass flow A is guided past the mixer, wherein at least one regulating body is provided, by means of which a flow cross-section Q in the mixer arrangement is varied so that a ratio $$V \text{ with} = \frac{A2}{A1}$$

is varied,
wherein
the mixer lies with an overlapping region within a bypass channel of the bypass, wherein the bypass channel completely surrounds a mixer wall of the mixer in such a way that the hot exhaust gas of the second portion A2 heats the mixer wall.

2. The mixer arrangement according to claim 1, wherein the injection device is placed on the mixer, wherein an additive can be injected into an injection section of the mixer by means of the injection device.

3. The mixer arrangement according to claim 1, wherein
the regulating body has an actuator by means of which the ratio V can be varied so that a variance range ΔA1 of the first portion A1 of the exhaust gas mass flow A is minimized depending on at least one engine parameter.

4. The mixer arrangement according to claim 1, wherein
an electronic control unit is provided, which is coupled to the regulating body and which regulates an actuator of the regulating body depending on at least one engine parameter.

5. The mixer arrangement according to claim 1, wherein the regulating apparatus is brought into a first position P1 and a second position P2, wherein the second portion A2 of the exhaust gas mass flow A through the bypass in the first position P1 of the regulating body is at most 30%, 20%, 10% or 0% with respect to the second portion A2 of the exhaust gas mass flow A in a second position P2 of the regulating body.

6. The mixer arrangement according to claim 1, wherein the mixer has a mixer wall which has a tubular configuration,
wherein multiple inflow openings are provided, wherein at least one blade is provided, which is set at an angle α with respect to an inflow opening so that a swirl movement of the exhaust gas is generated in the injection section.

7. The mixer arrangement according to claim 6, wherein at least two blades are provided, which are set at a different angle α with respect to the corresponding inflow opening in such a way that the exhaust gas mass flow B through each of the inflow openings is evened out.

8. The mixer arrangement according to claim 1, wherein the mixer has a mixer wall, wherein the mixer wall has an evaporation section downstream of the injection section, which can be wetted with the additive.

9. The mixer arrangement according to claim 8, wherein an active heating element for heating the evaporation section is provided.

10. The mixer arrangement according to claim 8, wherein
the mixer has a mixer wall and the bypass has a bypass channel, wherein, in the region of the evaporation section, the mixer wall at least partially forms the bypass channel, or the mixer wall at least partially adjoins the bypass channel or the mixer wall is at least partially joined to the bypass channel, so that a heat exchange can take place in each case between the mixer wall and the second portion A2 of the exhaust gas mass flow A.

11. The mixer arrangement according to claim 10, wherein
a perforation of the mixer wall is provided in the evaporation section.

12. The mixer arrangement according to claim 10, wherein
at least one elevated structure is provided on a first surface facing the bypass channel in the region of the evaporation section, and/or a second surface of the mixing wall of the evaporation section, which is wetted with the additive, is smoothed.

13. The mixer arrangement according to claim 1, wherein a post-chamber is provided downstream of the mixer, in which post-chamber the first portion A1 of the exhaust gas mass flow A and the second portion A2 of the exhaust gas mass flow A can be combined, wherein the post-chamber has an outlet opening from which the exhaust gas mass flow A can be guided out of the mixer arrangement.

14. A method for operating a mixer arrangement for an exhaust gas system according to claim 1, having
an inlet opening through which an exhaust gas mass flow A is guided,
a mixer which has at least one inflow opening that is fluidically connected to the inlet opening, wherein at least one first portion A1 of the exhaust gas mass flow A is guided through the mixer via the at least one inflow opening, wherein the mixer has an injection device, wherein an additive is injected into an injection section of the mixer by means of the injection device,
a bypass having at least one throughflow opening which is fluidically connected to the inlet opening, through which a second portion A2 of the exhaust gas mass flow A is guided past the mixer, wherein
there is provided a regulating body, wherein at least one flow cross-section in the mixer arrangement is varied by means of the regulating body so that a ratio V with $$V = \frac{A2}{V1}$$

is varied during the operation of the exhaust gas system.

15. The method for operating a mixer arrangement for an exhaust gas system according to claim 14,
wherein
the regulating body has an actuator by means of which the ratio V is varied such that a variance range ΔA1 of the first portion A1 of the exhaust gas mass flow A is minimized depending on at least one engine parameter.

* * * * *